US006491400B1

United States Patent
Chen et al.

(10) Patent No.: US 6,491,400 B1
(45) Date of Patent: Dec. 10, 2002

(54) CORRECTING FOR KEYSTONE DISTORTION IN A DIGITAL IMAGE DISPLAYED BY A DIGITAL PROJECTOR

(75) Inventors: Stephanie S. Chen, Rochester, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 49 days.

(21) Appl. No.: 09/694,963

(22) Filed: Oct. 24, 2000

(51) Int. Cl.[7] .................. G03B 21/00; G03B 21/14; G09G 5/00; H04N 3/23; H04N 5/74
(52) U.S. Cl. .................. 353/70; 353/69; 345/611; 348/746; 348/781
(58) Field of Search ............ 353/69, 70; 345/611; 348/746, 781

(56) References Cited

U.S. PATENT DOCUMENTS

| 5,283,602 A | 2/1994 | Kwon | 353/69 |
| 5,355,188 A | 10/1994 | Biles et al. | 353/69 |
| 5,532,764 A * | 7/1996 | Itaki | 348/745 |
| 5,706,062 A | 1/1998 | Stolov | 348/761 |
| 5,754,163 A * | 5/1998 | Kwon | 345/611 |
| 5,764,311 A | 6/1998 | Bonde et al. | 348/746 |
| 5,795,046 A | 8/1998 | Woo | 353/69 |
| 5,975,704 A | 11/1999 | Basey | 353/20 |
| 6,305,805 B1 * | 10/2001 | Liebenow | 353/69 |
| 6,340,994 B1 * | 1/2002 | Margulis et al. | 348/625 |

FOREIGN PATENT DOCUMENTS

JP 09-247593 9/1997

* cited by examiner

Primary Examiner—Russell Adams
Assistant Examiner—Magda Cruz
(74) Attorney, Agent, or Firm—Raymond L. Owens

(57) ABSTRACT

A method for correcting for keystone distortion and reducing aliasing defects in a digital image for use by a digital image projector, includes the steps of receiving an original digital image; lowpass filtering the original digital image to provide a lowpass filtered digital image having reduced high frequency spatial components which contribute to aliasing defects introduced by digital keystone correction; processing the lowpass filtered digital image to provide for digital keystone correction; and sharpening the keystone corrected digital image.

5 Claims, 5 Drawing Sheets

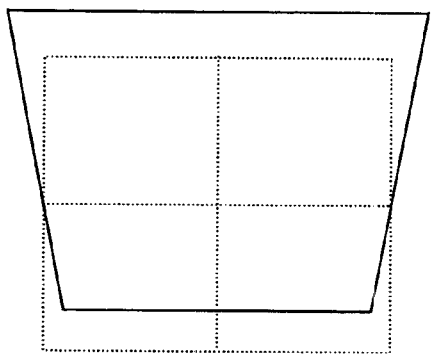
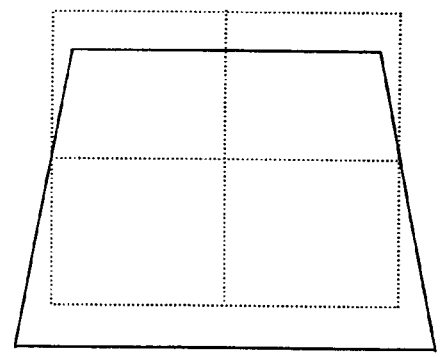
FIG. 3a  FIG. 3b
(PRIOR ART)

CORRECTING FOR KEYSTONE DISTORTION IN A DIGITAL IMAGE DISPLAYED BY A DIGITAL PROJECTOR

FIELD OF THE INVENTION

The present invention relates to digital projection of images and, more particularly, to correcting for keystone distortion in such projected images.

BACKGROUND OF THE INVENTION

Image projection systems are used to project images onto a viewing screen. Examples of projection systems include overhead projectors, traditional slide projectors, and digital projectors. FIG. 1 depicts a digital projector 10 projecting an image onto a viewing screen 12, where the optical axis of the projector 14 is normal to the plane of the viewing screen. These systems are typically used by positioning the projector on a level surface (e.g., tabletop, desk, file cabinet, etc.), and projecting the image up at an angle above the plane of the surface, so that the view of the projected image is unobstructed by the audience. Referring to FIG. 2, when the projector 16 is positioned such that the optical axis 18 of the projection lens is at an angle 20 relative to the normal to the viewing screen 22, geometrical distortion is introduced to the projected image. Let the convention be that a positive angle represents a tilt above the normal to the viewing screen (positive tilt), and a negative angle represents a tilt below the normal to the viewing screen (negative tilt). In the case for positive tilt, the distance from the top of the image to the projection lens 24 is longer than the distance from the bottom of the image to the projection lens 26. The path length discrepancy results in a larger magnification at the top of the image than at the bottom, thus yielding an image that has a larger width at the top of the image than the bottom. The projected image is trapezoidal in shape and is referred to as "keystone" distortion since the distorted image resembles the shape of a keystone (FIG. 3a). In the case of negative tilt where the projected image is lower than the projector, e.g., ceiling mounted projectors, the distorted image becomes an inverted keystone shape, where the width of the top of the image is now smaller than the bottom (FIG. 3b).

There are several methods disclosed in the prior art addressing the correction for keystone distortion in projected images of projection systems. Among these are numerous patents that describe optical keystone correction implementations for fixed projection angles (see U.S. Pat. Nos. 5,283,602, 5,355,188 and 5,706,062). Although some effort has been made towards developing a projector with a variable optical keystone correction (U.S. Pat. No. 5,975,704), optical correction is generally limited to a fixed angle. In addition to the restricted correction angle, the more complicated optical design increases the cost in manufacturing and potentially increases size and weight. An alternative to the optical correction method that is now possible since the availability of digital projection systems is electronic or digital keystone correction.

Digital keystone correction is implemented by performing a compensation operation on the original digital image prior to projection. If the original digital image is distorted such that the amount of distortion is the inverse of the distortion introduced by the projection setup, then the final projected image will be rectilinear. One of the benefits of digital keystone correction is that additional optical elements are not needed since the correction is performed electronically. In addition, the correction applied to the original digital image can be varied according to the tilt angle and direction of tilt (positive and negative keystone correction). Despite the added flexibility with digital keystone correction, there are some limitations. Interpolation artifacts such as loss in sharpness and aliasing, which can manifest themselves as low frequency banding patterns and edge discontinuities, may be introduced as a result of digital keystone correction.

There exist in the prior art several patents that disclose different methods of implementing a digital keystone correction process in hardware (U.S. Pat. Nos. 5,764,311 and 5,795,046); however, these methods do not address the reduction of the interpolation artifacts. Kazutaka, et. al., teach a method of reducing edge discontinuity artifacts after keystone correction in Japanese Patent No. 09-247593; however, this method focuses on correcting for artifacts after they have been introduced by the keystone correction process. Once introduced into the original image information, it is very difficult to eliminate these artifacts without further degrading the image.

SUMMARY OF THE INVENTION

It is an object of the present invention to correct for keystoning distortion in digital images projected by a digital projector.

This object is achieved by a method for correcting for keystone distortion and reducing aliasing defects in a digital image for use by a digital image projector, comprising the steps of:

(a) receiving an original digital image;

(b) lowpass filtering the original digital image to provide a lowpass filtered digital image having reduced high frequency spatial components which contribute to aliasing defects introduced by digital keystone correction;

(c) processing the lowpass filtered digital image to provide for digital keystone correction; and (d) sharpening the keystone corrected digital image.

The present invention provides a method that reduces the occurrence of aliasing defects prior to the digital keystone correction process, while preserving the sharpness of the original digital image.

It is an advantage of the present invention that it reduces aliasing defects while at the same time correcting for keystone distortion. A second advantage is that the loss of sharpness due to the interpolation process is compensated for in the present invention.

BRIEF DESCRIPTION OF THE DRAWINGS

FIGS. 3A and 3B depict two different prior art types of keystone distortion that are produced by the digital projector of FIG. 2;

DETAIL DESCRIPTION OF THE PREFERRED EMBODIMENT

Figure 4:
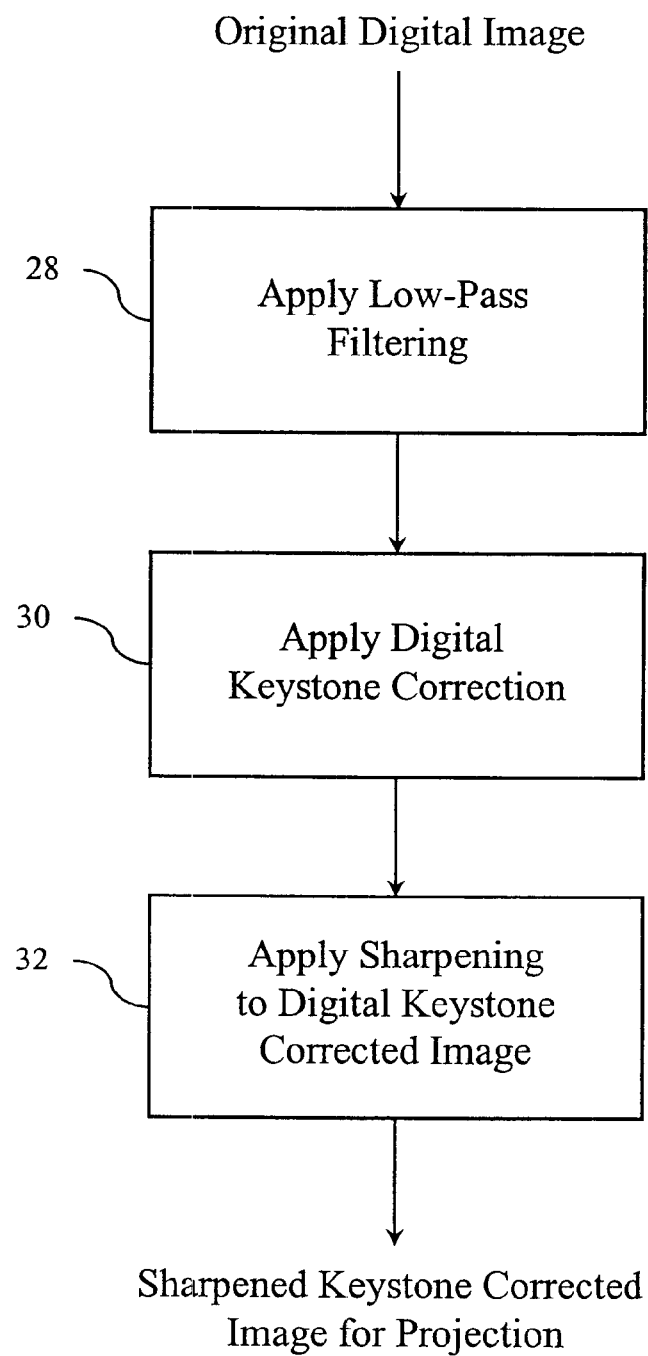
FIG. 4 is a block diagram which depicts the overall operation of the method in accordance with the present invention.

Referring to FIG. 4, Block 28 depicts the application of lowpass filtering on the original digital image to provide a lowpass filtered digital image having reduced high frequency spatial components which contribute to aliasing defects introduced by the digital keystone correction. Aliasing is an artifact related to the high frequency spatial components and caused when the digital sampling is at a too low of a sampling frequency. This step can be represented mathematically as the convolution of the original digital image, I, and a lowpass filter, $K_{LP}$:

$$I_B = I * K_{LP} \tag{1}$$

wherein $I^B$ is the lowpass filtered digital image. A suitable choice for a lowpass filter is:

$$\tfrac{1}{16} \cdot [-1 \ 4 \ 10 \ 4 \ -1]. \tag{2}$$

The application of a lowpass filter to a digital image is well known to those skilled in the art and therefore need not be described in further detail here.

Figure 5:
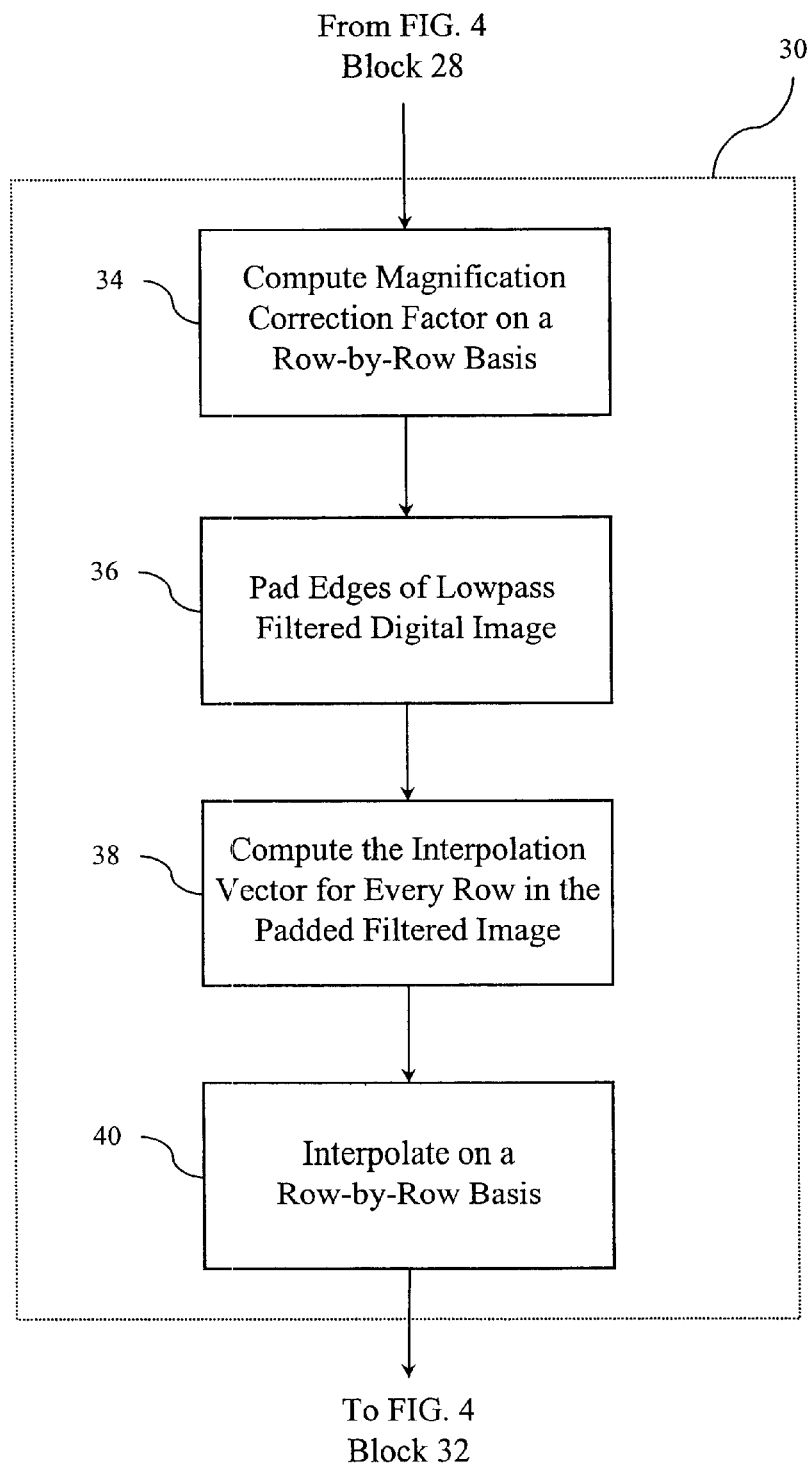
FIG. 5 is a detail of Block 30 in FIG. 4.

Block 30 depicts the application of the digital keystone correction step, and it is expanded in FIG. 5 to show four subsequent processing steps. Referring to FIG. 5, Block 34 depicts the computation of the magnification correction factor as a function of row. This can be accomplished by assuming a simple thin lens model and using the ABCD Matrix ray tracing method to calculate the location of the ideal image plane and the system magnification at the ideal image plane. It is assumed that parameters such as the object size, object-to-lens distance, and the focal length of the projection lens are known. The term object in this discussion refers to the light modulator (e.g. LCD panel) in the projector. It will be understood by one skilled in the art that the use of the thin lens approximation is just one method of modeling the optical system. Alternative approaches to modeling the optical system can be used arrive at the necessary parameters.

Figure 1:
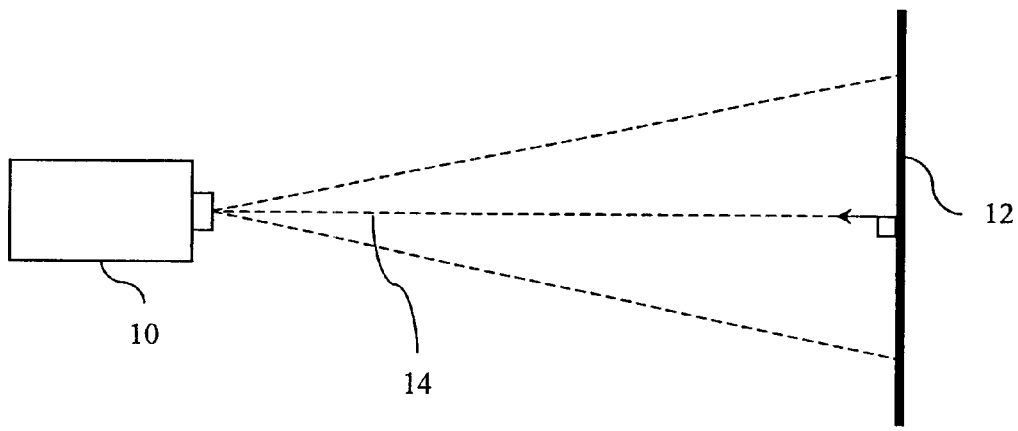
FIG. 1 is a prior art schematic showing a digital projector which projects an image onto a viewing screen.
Figure 2:
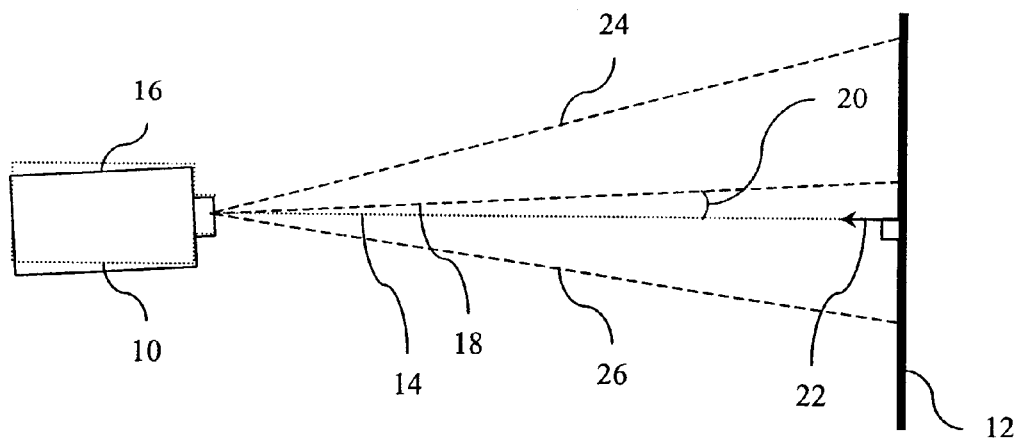
FIG. 2 shows the prior art digital projector of FIG. I being tilted in a vertical direction.
Figure 6:
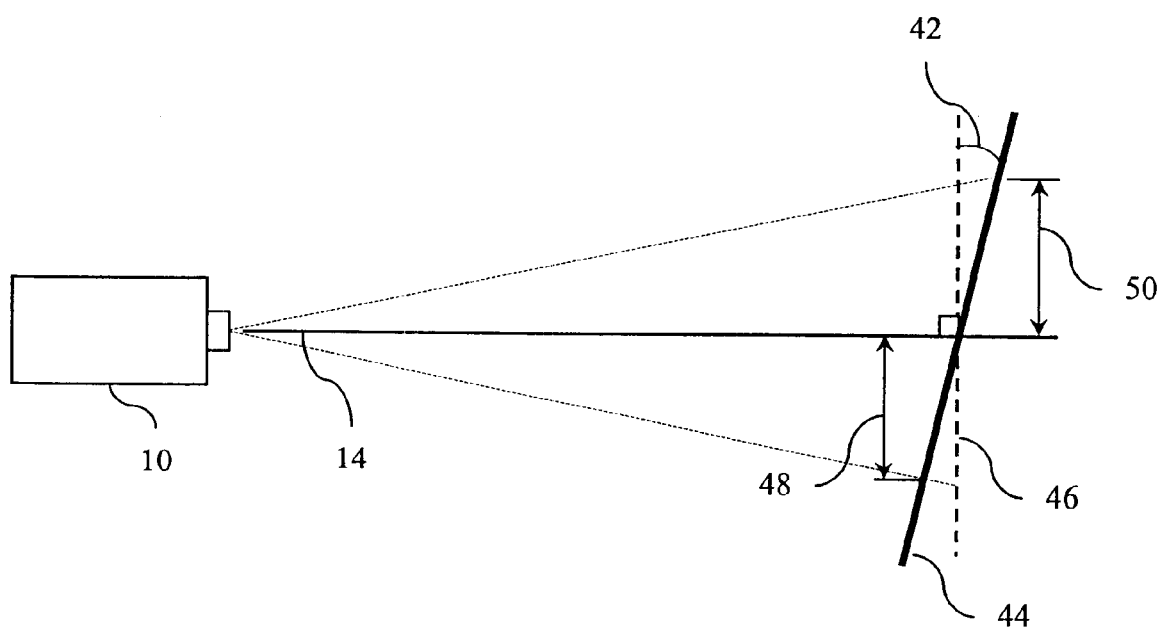
FIG. 6 shows an alternative projection configuration to FIG. 2.

FIG. 6 depicts an alternative representation of the projection configuration shown in FIG. 2. The keystone angle 42 is now represented by the angle formed between the tilted image plane 44 and the ideal image plane 46. Note that angle 42 in FIG. 6 is mathematically equivalent to angle 20 in FIG. 2. The image heights 48 and 50 can be computed using trigonometry. These image heights can then be used to compute the respective magnifications at the tilted plane. The magnification change as a function of row is determined by assuming that the magnification varies linearly from the top to the bottom of the image. The magnification correction factor for a particular row is the inverse of the magnification at that row, normalized to the minimum magnification value for all rows. It can be expressed as:

$$\text{cor\_mag}_i = \frac{1}{mag_i} \cdot (\text{min\_mag}) \tag{3}$$

wherein $\text{cor\_mag}_i$ is the correction factor at row i, $mag_i$ is the magnification at row i, and min_mag is the minimum magnification over all rows in the keystone distorted image.

Referring again to FIG. 5, Block 36 depicts the process of padding the lowpass filtered image with columns of zeros at the left and right edges of the image. This step is necessary to avoid edge effects in the interpolation process. A suitable choice for the number of columns of padding is 20 columns per side. The padded, lowpass filtered digital image will hereinafter be referred to as the "padded digital image".

Block 38 depicts the computation of the interpolation vector using the magnification correction factors computed in Block 34. The interpolation vector is a vector containing new pixel locations for a row of data that has been appropriately scaled by the corresponding magnification correction factor. The new pixel location for a pixel in a particular column and row can be calculated by the following equation:

$$\text{cor\_xI}_{ij} = \left( \frac{1}{\text{cor\_mag}_i} \right) \cdot (\text{cor\_x}_j - \text{cor\_zero}) + \text{cor\_zero} \tag{4}$$

wherein $\text{cor\_xI}_{ij}$ is the new pixel location for the j-th pixel in the i-th row, $\text{cor\_mag}_i$ is defined by equation (3), $\text{cor\_x}_j$ is the column location of the j-th pixel in the padded digital image, and cor_zero is an offset value corresponding to the center of the padded digital image.

Finally, Block 40 in FIG. 5 depicts the interpolation process using the interpolation vectors computed in Block 38. The padded digital image data is used to compute the new pixel values at the scaled pixel locations specified by the interpolation vector on a row by row basis. Each row of the image data is effectively compressed or expanded in length depending on the value of the magnification correction factor. The padded digital image data is resampled at the spacing determined by the interpolation vectors. The data can be resampled using various methods, e.g., linear, cubic, or cubic spline interpolation. A suitable choice for the resampling is cubic spline interpolation. The output from Block 40 is a keystone corrected digital image.

The final step in the keystone correction process outlined in FIG. 4 is image sharpening as depicted by Block 32. This step can be represented mathematically by the following expression:

$$I_S = I_{KC} + G \cdot (I_{KC} * K_{HP}) \tag{5}$$

wherein $I^{KC}$ is the keystone corrected digital image, G is a gain factor, and $K_{HP}$ is a highpass filter. A suitable choice for a highpass filter is:

$$\tfrac{1}{4} \cdot [-1 \ 0 \ 6 \ 0 \ -1] \tag{6}$$

and a suitable value for the gain factor is:

$$G = 1. \tag{7}$$

A look-up table (LUT) can be used to reduce some of the sharpening artifacts such as "ringing" at edges. This LUT is used to remap the values from the second term in equation (5), which will be referred to as the edge_boost term. A suitable table shape is a piecewise linear curve with:

$$slope = \begin{cases} \frac{100}{128}, & \text{for edge\_boost} \leq 0; \\ \frac{40}{128}, & \text{for edge\_boost} > 0; \end{cases} \tag{8}$$

The entire sharpening process can be expressed as:

$$I_S = I_{KC} + LUT[G \cdot (I_{KC} * K_{HP})] \tag{9}$$

wherein LUT is the look-up table, and the remaining terms are defined in equation (5).

It will be understood by one skilled in the art that the present invention can be extended so that two-dimensional keystone correction can be achieved by two orthogonal, one-dimensional keystone corrections. The lowpass filtering and sharpening steps can also be also be extended to two-dimensions accordingly.

The invention has been described in detail with particular reference to certain preferred embodiments thereof, but it will be understood that variations and modifications can be effected within the spirit and scope of the invention.

PARTS LIST 10 untilted digital projector relative to the normal of the viewing screen
12 the viewing screen
14 optical axis of the untilted digital projector 10
16 tilted digital projector relative to the normal of the viewing screen
18 optical axis of the tilted digital projector 16
20 angle between the optical axis of the tilted projector and the normal to the viewing screen
22 normal to the viewing screen
24 distance from the top of the projected image to the tilted projector lens
26 distance from the bottom of the projected image to the tilted projector lens
28 block depicting application of a lowpass filter to the original digital image
30 block depicting application of the keystone correction to the lowpass filtered digital image
32 block depicting application of sharpening to the keystone corrected image
34 block depicting computation of magnification correction factors
36 block depicting application of image padding
38 block depicting computation of the interpolation vectors
40 block depicting interpolation on a row by row basis using the interpolation vector for keystone correction
42 angle between tilted image plane and ideal image plane
44 tilted image plane
46 ideal image plane
48 distance between the bottom of the projected image and the optical axis of the untilted projector
50 distance between the top of the projected image and the optical axis of the untilted projector

What is claimed is:

1. A method for correcting for keystone distortion and reducing aliasing defects in a digital image for use by a digital image projector, comprising the steps of:

(a) receiving an original digital image;

(b) lowpass filtering the original digital image to provide a lowpass filtered digital image having reduced high frequency spatial components which contribute to aliasing defects introduced by digital keystone correction;

(c) processing the lowpass filtered digital image to provide for digital keystone correction; and (d) sharpening the keystone corrected digital image.

2. The method of claim 1 wherein the keystone corrected digital image is projected by the digital projector to provide a digital image.

3. A method for correcting for keystone distortion and aliasing defects in a digital image having pixels arranged in rows and columns for use by a digital image projector, comprising the steps of:

(a) receiving an original digital image;

(b) lowpass filtering the original digital image to provide a lowpass filtered digital image having pixels arranged in rows and columns and having reduced high frequency spatial components which contribute to aliasing defects introduced by digital keystone correction;

(c) processing the lowpass filtered digital image to provide for digital keystone correction by correcting each row in the lowpass filtered digital image in accordance with magnification changes in the digital image when it is projected onto a viewing surface; and (d) sharpening the keystone corrected digital image.

4. The method of claim 3 wherein the keystone corrected digital image is projected by the digital projector to provide a digital image.

5. A method for correcting for keystone distortion and reducing aliasing defects in a digital image having pixels arranged in rows and columns for use by a digital image projector, comprising the steps of:

(a) receiving an original digital image;

(b) lowpass filtering the original digital image to provide a lowpass filtered digital image having pixels arranged in rows and columns and having reduced high frequency spatial components which contribute to keystone defects;

(c) processing the lowpass filtered digital image to provide for digital keystone correction by correcting each row in the lowpass filtered digital image in accordance with magnification changes in the digital image when it is projected onto a viewing surface in accordance with the following scaling relationship for each row:

$$\mathrm{cor\_xI}_{ij} = \left(\frac{1}{\mathrm{cor\_mag}_i}\right) \cdot (\mathrm{cor\_x}_j - \mathrm{cor\_zero}) + \mathrm{cor\_zero}$$

wherein $\mathrm{cor\_xI}_{ij}$ is the new pixel location for the j-th pixel in the i-th row, $\mathrm{cor\_mag}_i$ is the magnification correction factor, $\mathrm{cor\_x}_j$ is the column location of the j-th pixel in the padded digital image, and $\mathrm{cor\_zero}$ is an offset value corresponding to the center of the padded digital image; and (d) sharpening the keystone corrected digital image.

* * * * *